(12) United States Patent
Romem et al.

(10) Patent No.: US 10,372,374 B2
(45) Date of Patent: Aug. 6, 2019

(54) SYSTEM AND METHOD FOR PROVIDING INPUT/OUTPUT DETERMINISM FOR SERVERS HOSTING REMOTELY ACCESSIBLE STORAGES

(71) Applicant: Excelero Storage Ltd., Tel Aviv (IL)

(72) Inventors: Yaniv Romem, Jerusalem (IL); Omri Mann, Jerusalem (IL); Ofer Oshri, Kfar Saba (IL)

(73) Assignee: Excelero Storage Ltd., Tel-Aviv (IL)

( * ) Notice: Subject to any disclaimer, the term of this patent is extended or adjusted under 35 U.S.C. 154(b) by 0 days.

(21) Appl. No.: 15/797,815

(22) Filed: Oct. 30, 2017

(65) Prior Publication Data
US 2018/0129449 A1    May 10, 2018

Related U.S. Application Data

(60) Provisional application No. 62/418,847, filed on Nov. 8, 2016.

(51) Int. Cl.
*G06F 3/06* (2006.01)
*G06F 13/10* (2006.01)

(52) U.S. Cl.
CPC ........... *G06F 3/0655* (2013.01); *G06F 3/061* (2013.01); *G06F 3/067* (2013.01); *G06F 3/0611* (2013.01); *G06F 3/0629* (2013.01); *G06F 3/0659* (2013.01); *G06F 13/102* (2013.01)

(58) Field of Classification Search
CPC combination set(s) only.
See application file for complete search history.

(56) References Cited

U.S. PATENT DOCUMENTS

| | | | |
|---|---|---|---|
| 8,346,995 B2 * | 1/2013 | Green | G06F 9/4881 710/25 |
| 2008/0040592 A1 * | 2/2008 | Vasekin | G06F 9/30058 712/238 |

* cited by examiner

*Primary Examiner* — Raymond N Phan
(74) *Attorney, Agent, or Firm* — M&B IP Analysts, LLC

(57) ABSTRACT

Systems and methods for providing input/output (I/O) determinism. An I/O instruction and at least one service level indicator are received, wherein the at least one service level indicator includes a required time for executing the I/O instruction. It is determined whether the I/O instruction can be executed on the storage within the required time. When it is not determined that the I/O instruction can be executed on the storage within the required time, a notification is sent.

14 Claims, 4 Drawing Sheets

SYSTEM AND METHOD FOR PROVIDING INPUT/OUTPUT DETERMINISM FOR SERVERS HOSTING REMOTELY ACCESSIBLE STORAGES

CROSS-REFERENCE TO RELATED APPLICATIONS

This application claims the benefit of U.S. Provisional Application No. 62/418,847 filed on Nov. 8, 2016, the contents of which are hereby incorporated by reference.

TECHNICAL FIELD

The present disclosure relates generally to storage access, and more specifically to executing input/output instructions with respect to storage access protocols.

BACKGROUND

Input/output (I/O) determinism involves utilizing information related to reading and writing of I/O instructions to more efficiently implement such instructions. To provide I/O determinism, a server may require knowledge of the particular architecture of a storage device. For example, the server may require an estimated amount of time for a particular I/O instruction to be executed on a storage device. If the instruction will take too long to execute on the storage device, it may be faster to send the instruction to another storage device.

Although I/O determinism may increase efficiency of executing I/O instructions, the process requires access to information related to the storage for which I/O instructions are to be executed. This information may include information that the manufacturer of the storage may not desire to share. Thus, implementation of I/O determinism may not always be practical.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing input/output (I/O) determinism for a server hosting at least a remotely accessible storage. The method comprises receiving an I/O instruction and at least one service level indicator from a client device, wherein the at least one service level indicator includes a required time for executing the I/O instruction; determining whether the I/O instruction can be executed on the storage within the required time; and sending, to the client device, a notification, when it is not determined that the I/O instruction can be executed on the storage within the required time.

Certain embodiments disclosed herein also include a system for providing input/output (I/O) determinism. The system comprises: a storage; a processing circuitry; and a memory, the memory containing instructions that, when executed by the processing circuitry, configure the system to: receive an I/O instruction and at least one service level indicator from a client device, wherein the at least one service level indicator includes a required time for executing the I/O instruction; determine whether the I/O instruction can be executed on the storage within the required time; and send, to the client device, a notification, when it is not determined that the I/O instruction can be executed on the storage within the required time.

Certain embodiments disclosed herein also include a method for providing input/output (I/O) determinism for a server hosting at least a storage, the server including a processing circuitry. The method comprises: sending, by the processing circuitry to the storage, an I/O instruction and at least one service level indicator, wherein the at least one service level indicator includes a required time for executing the I/O instruction; determining, by the storage, whether the I/O instruction can be executed on the storage within the required time; and sending, to the processing circuitry by the storage, a notification, when it is not determined that the I/O instruction can be executed on the storage within the required time.

Certain embodiments disclosed herein also include a system for providing input/output (I/O) determinism. The system comprises: a storage; a processing circuitry; and a memory, the memory containing instructions that, when executed by the processing circuitry, configure the system to: sending, by the processing circuitry to the storage, an I/O instruction and at least one service level indicator, wherein the at least one service level indicator includes a required time for executing the I/O instruction; determining, by the storage, whether the I/O instruction can be executed on the storage within the required time; and sending, to the processing circuitry by the storage, a notification, when it is not determined that the I/O instruction can be executed on the storage within the required time.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
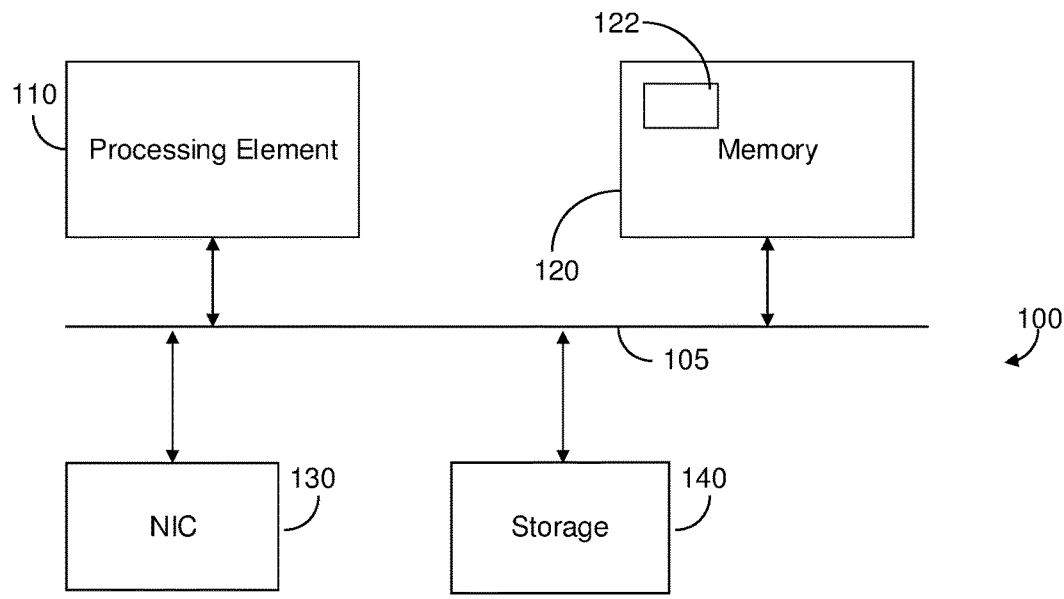
FIG. 1 is a schematic illustration of a storage server configured to provide I/O determinism for remote memory access according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Specifically, exposing the architecture of a storage system may allow malicious entities to discover weaknesses in the architecture, thereby risking data leaks or loss of service. Thus, it would be desirable to provide I/O determinism without providing, to a system attempting to access a storage (for example, a client device attempting to write to the storage), information related to the architecture or ongoing activities of the storage.

The various disclosed embodiments include a method and system for providing increased security input/output (I/O) determinism. An I/O instruction to access a storage is received from an accessing system attempting to access the storage. The I/O instruction includes a service level indicator that indicates requirements for the I/O instruction. The requirements at least include required time indicating a time frame in which the I/O instruction is to be executed. It is determined whether execution of the I/O instruction on the storage would meet the requirements. When it is determined that the execution would not meet the requirements, a notification indicating that the I/O instruction cannot be executed may be sent to the accessing system.

In some implementations, based on the determination, the I/O instruction may be aborted, executed on the storage, or executed on another storage. Specifically, if the I/O instruction would meet the requirements, execution of the I/O instruction may continue. Otherwise, the I/O instruction may be aborted or performed on another storage.

The embodiments disclosed herein allow for I/O determinism without direct access to architectural information of storages by accessing systems, thereby resulting in increased efficiency of storage while maintaining security. Specifically, I/O instructions may be executed on storages that are currently able to complete execution instructions meeting requirements (for example, requirements indicated in service level agreements) without exposing the architecture of each storage server to an accessing system attempting to execute the I/O instructions.

In an example implementation, a client device sends one or more I/O instructions to be executed on a storage. A system for providing I/O determinism checks whether the I/O instructions can be executed on the storage and, if not, the system sends a notification to the client device indicating that the instructions cannot be executed.

In another example implementation, a processing circuitry of a storage server sends one or more I/O instructions to be executed on a storage of the storage server. The storage checks whether the I/O instructions can be executed and, if not, the storage sends a notification to the client device indicating that the instructions cannot be executed.

FIG. 1 shows an example schematic diagram illustrating a storage server 100 configured to provide I/O determinism for remote direct memory access according to an embodiment. The storage server 100 includes a processing circuitry 110, a memory 120, a network interface controller (NIC) 130, and one or more storages 140 (hereinafter referred to as a storage 140, merely for simplicity purposes). In an embodiment, the components of the storage server 100 may be communicatively connected via a bus 105.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. In one configuration, computer readable instructions to implement one or more embodiments disclosed herein may be stored in the storage 140.

Alternatively or collectively, the memory 120 may be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 110 to provide I/O determinism as described herein. To this end, the memory 120 may include a memory portion 122 containing the instructions for causing the processing circuitry 110 to provide I/O determinism as described herein. In an example implementation, the instructions may be instructions for configuring the processing circuitry to perform the method described herein below with respect to FIG. 5.

The storage 140 may be magnetic storage, optical storage, and the like, and may be realized, for example, as flash memory or other memory technology, CD-ROM, Digital Versatile Disks (DVDs), or any other medium which can be used to store the desired information. In some implementations, the storage server 100 may include a plurality of storages 140. The storage 140 may be utilized for storing data accessible to client devices via remote direct memory access (RDMA). The storage 140 may further include a memory (not shown) for storing a queue of I/O instructions to be executed by the storage 140.

The network interface controller 130 allows the storage server 100 to communicate with a network (shown and described in more detail in FIG. 4) for purposes such as, but not limited to, receiving data to be stored in the storage 140, providing access to data stored in the storage 140, and the like. The communications via the network may therefore be utilized to provide remote direct memory access to data stored in the storage 140 by a client device (e.g., the client device 200, FIG. 2). Specifically, the network interface controller 130 may enable communication via RDMA protocols such as, but not limited to, Infiniband, RDMA over Converged Ethernet (RoCE), iWARP, and the like. Infiniband is a communication protocol for high performance computing that offers high throughput and low latency. It should be noted that Infiniband, RoCE, and iWARP are discussed herein merely for example purposes, and that other communication protocols may be equally utilized in accordance with the embodiments disclosed herein without departing from the scope of the disclosure.

Figure 2:
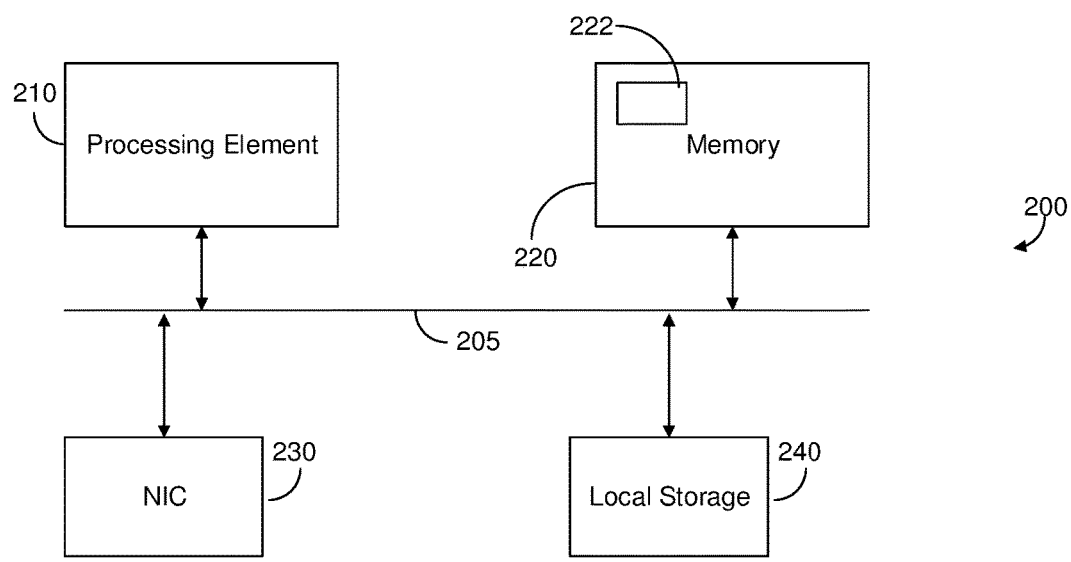
FIG. 2 is a schematic illustration of a client device configured for accessing a remote server.

FIG. 2 shows an example schematic diagram illustrating a client device 200 configured to access a remote storage (e.g., the storage 140 of the remote storage server 100) that may require I/O determinism over RDMA. The client device 200 includes a processing circuitry 210, a memory 220, a network interface controller (NIC) 230, and a local storage 240. In an embodiment, the components of the client device 200 may be communicatively connected via a bus 205.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 240.

Alternatively or collectively, the memory 220 may be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to provide I/O determinism as described herein. To this end, the memory 220 may include a memory portion 222 containing the instructions for causing the processing circuitry 210 to perform RDMA operations.

The storage 240 may be magnetic storage, optical storage, and the like, and may be realized, for example, as flash memory or other memory technology, CD-ROM, Digital Versatile Disks (DVDs), or any other medium which can be used to store the desired information.

The network interface controller 230 allows the client device 200 to communicate with a network (shown and described in more detail in FIG. 4) for purposes such as, but not limited to, receiving data from a storage, storing data in a storage, sending I/O instructions to a remote storage server, and the like. The communications via the network may therefore be utilized to remotely access a storage server (e.g., the storage server 100, FIG. 1). Specifically, the network interface controller 230 may enable communication via RDMA protocols such as, but not limited to, Infiniband, RDMA over Converged Ethernet (RoCE), iWARP, and the like. Infiniband is a communication protocol for high performance computing that offers high throughput and low latency. It should be noted that Infiniband, RoCE, and iWARP are discussed herein merely for example purposes, and that other communication protocols may be equally utilized in accordance with the embodiments disclosed herein without departing from the scope of the disclosure.

In some implementations, the client device 200 may include or be communicatively connected to input devices (not shown) such as, but not limited to, a keyboard, a mouse, a touchscreen, and the like; as well as output devices (not shown) such as, but not limited to, a display.

Figure 3:
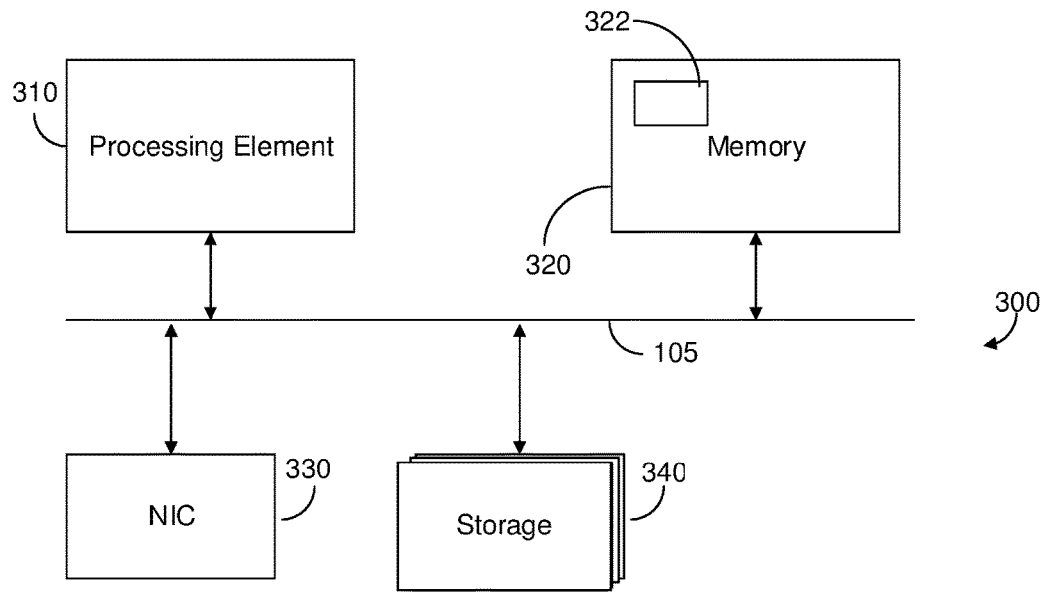
FIG. 3 is a schematic illustration of a storage server configured to provide I/O determinism according to another embodiment.

FIG. 3 shows an example schematic diagram illustrating a storage server 300 configured to provide I/O determinism according to an embodiment. The storage server 300 includes a processing circuitry 310, a memory 320, a network interface controller (NIC) 330, and one or more storages 340 (hereinafter referred to individually as a storage 340 and collectively as storages 340, merely for simplicity purposes). In an embodiment, the components of the storage server 100 may be communicatively connected via a bus 305.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 340.

Alternatively or collectively, the memory 320 may be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to provide I/O determinism as described herein. To this end, the memory 320 may include a memory portion 322 containing the instructions for causing the processing circuitry 310 to provide I/O determinism as described herein. In an example implementation, the instructions may be instructions for configuring the processing circuitry to perform the method described herein below with respect to FIG. 6.

The storage 340 may be magnetic storage, optical storage, and the like, and may be realized, for example, as flash memory or other memory technology, CD-ROM, Digital Versatile Disks (DVDs), or any other medium which can be used to store the desired information. In some implementations, the storage server 300 may include a plurality of storages 340. The storage 340 may be utilized for storing data accessible to client devices via remote direct memory access (RDMA). The storage 340 may further include a memory (not shown) for storing a queue of I/O instructions to be executed by the storage 340.

In some implementations, the storages 340 may include at least a first storage 340-1 and a second storage 340-2. The first storage 340-1 may have a different architecture than the second storage 340-2. Each storage 340 may include a storage processing circuitry and a memory portion (not shown), where the memory portion includes instructions for configuring the storage processing circuitry to perform I/O instructions received from the processing circuitry 310 of the storage server 300, to determine whether such I/O instructions to be performed on the storage 340 will comply with any service level requirements, and the like. For example, the storage 340-1 may determine that it is currently performing garbage collection and, therefore, cannot meet time requirements for an incoming write instruction. When the storage 340-1 determines that it cannot meet such requirements, the storage 340-1 may be configured to, for example, continue executing the instruction (e.g., by placing the instruction in an I/O queue), abort the instruction, and the like.

In an embodiment, the storage server 300 may be configured to define a service level agreement for I/O instructions including requirements for serving requests to execute I/O instructions. The requirements may be per type of I/O instruction requested, for I/O instructions in each I/O queue, based on a Quality of Service identifier in each I/O instruction, a combination thereof, and the like.

The network interface controller 330 allows the storage server 300 to communicate with a network (not shown) for purposes such as, but not limited to, receiving requests to execute I/O instructions, providing access to data stored in the storage 140, and the like. The communications via the network may therefore be utilized to provide remote direct memory access to data stored in the storage 340 by a client device (e.g., the client device 200, FIG. 2). Specifically, the network interface controller 330 may enable communication via RDMA protocols such as, but not limited to, Infiniband, RDMA over Converged Ethernet (RoCE), iWARP, and the like. Infiniband is a communication protocol for high performance computing that offers high throughput and low latency. It should be noted that Infiniband, RoCE, and iWARP are discussed herein merely for example purposes, and that other communication protocols may be equally utilized in accordance with the embodiments disclosed herein without departing from the scope of the disclosure.

Figure 4:
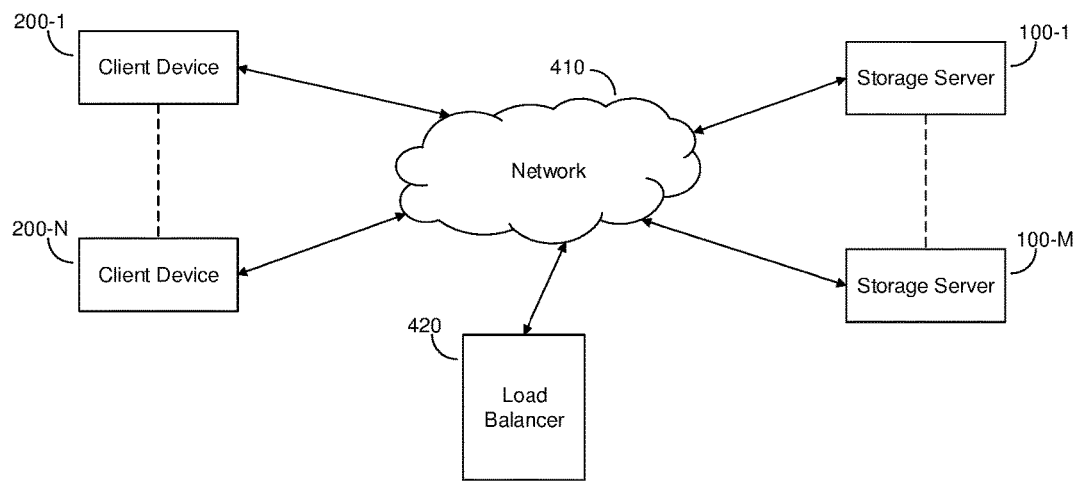
FIG. 4 is a network diagram utilized to describe various disclosed embodiments.

FIG. 4 is an example network diagram 400 utilized to describe various disclosed embodiments. In the example network diagram 400, client devices 200-1 through 200-N (hereinafter referred to individually as a client device 200 and collectively as client devices 200, merely for simplicity purposes), storage servers 100-1 through 100-M (hereinafter referred to individually as a storage server 100 and collectively as storage servers 100, merely for simplicity purposes), and a load balancer 420 are communicatively connected via a network 410.

The network 410 may be, but is not limited to, a wireless, cellular or wired network, a local area network (LAN), a wide area network (WAN), a metro area network (MAN), the Internet, the worldwide web (WWW), similar networks, and any combination thereof. The network 410 may support one or more remote direct memory access (RDMA) protocols such as, but not limited to, iWARP, NVMe over fabrics, Infiniband, and the like.

Each of the storage servers 100 includes a storage 140 (not shown in FIG. 4), and may be configured to provide remote direct memory access (RDMA) for the storage 140 to one or more of the client devices 200. In some implementations, which storage server 100 should handle incoming requests to execute I/O instructions may be determined based on a priority. The priority may be further based on the type of the I/O instruction to be executed, expected parameters for execution (e.g., time), and the like. For example, for a write instruction, it may not matter to a client device 200-2 which storage server 100 writes the data, so the write instruction may be sent to a storage server 100-4 that can execute the write instruction faster than a storage server 100-3.

Different client devices 200 may have different requirements for executing I/O instructions. The priority may be defined in a service level agreement (SLA) between a client device 200 and an operator of the storage servers 100. Alternatively or collectively, a client device 200 may send SLA indicators with respective I/O instructions to be executed. An SLA indicator may be, for example, a timeframe in which the I/O instruction must be completed.

Each storage server 100 is configured to determine whether I/O instructions to be executed by the storage server 100 would meet with I/O requirements. Determining whether I/O instructions can be executed while meeting I/O requirements via the storage server 100 rather than via the client device 200 allows for providing I/O determinism without exposing information demonstrating the architecture of the storage server 100 to the client device 200. Accordingly, I/O determinism may be provided while reducing security threats to the storage server 100.

In an example implementation, a client device 200-1 sends an I/O instruction to be executed to a storage server 100-5 over the network 410. The storage server 100-5 may have stored therein a queue of I/O instructions which are being performed or to be performed. When the sent I/O instruction cannot be executed while meeting requirements of a SLA between the client device 200-1 and the storage server 100-5, the storage server 100-5 is configured to send a notification to the client device 200-1. For example, when the requirements include a time requirement and the storage server 100-5 is currently executing an erase instruction or garbage collection, a write instruction may not be completed within the required time, and a notification indicating so may be sent from the storage server 100-5 to the client device 200-1. When the notification is received, the client device 200-1 may send the I/O instruction to a different storage server 100-3. Thus, the time for executing the write instruction may be reduced without increasing security risks due to exposure of the architecture of the storage server 100-5 to the client device 200-1.

In some implementations, when an I/O instruction would not meet SLA requirements when executed on a first storage server 100-1, the first storage server 100-1 may be configured to send the I/O instruction to a second storage server 100-2. In another implementation, the I/O instructions from the client devices 200 may be received at the load balancer 420 for distribution among the storage servers 100. The load balancer 420 may be configured to distribute the I/O instructions based on, for example, the service level indicators of each I/O instruction.

Figure 5:
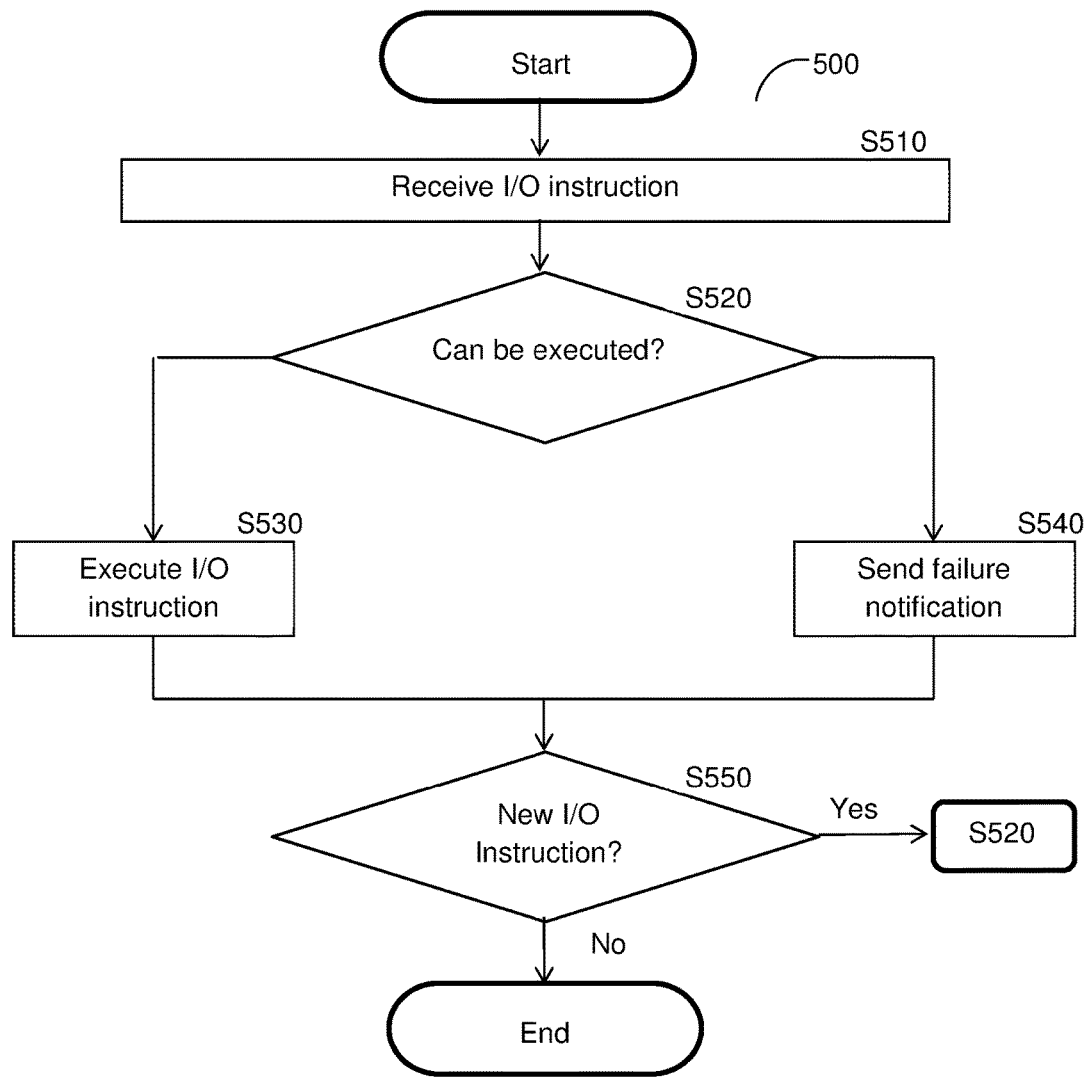
FIG. 5 is a flowchart illustrating a method for providing remote access I/O determinism according to an embodiment.

FIG. 5 is an example flowchart 500 illustrating a method for providing I/O determinism between a client device and a storage server according to an embodiment. In an embodiment, the method may be performed by a storage server 100 to provide efficient storage access to a client device 200.

At S510, an I/O instruction is received from the client device 200. In an embodiment, service level agreement (SLA) indicators may also be received. The SLA indicators may indicate one or more requirements for executing the I/O instruction.

At S520, it is determined whether the received I/O instruction can be executed and, if so, execution continues with S530; otherwise, execution continues with S540. In an embodiment, the I/O instruction can be executed if the execution of the I/O instruction will meet the requirements for executing the I/O instruction. The determination is based on one or more requirements such as, but not limited to, requirements indicated in the received SLA indicators, requirements indicated in a SLA between the client device 200 and the storage server 100, and the like. The SLA agreement may define requirements with respect to, for example, different types of I/O instructions (e.g., read, write, erase, trim, etc.), different I/O queues, and the like.

Determining whether the I/O instruction can be executed may include, but is not limited to, determining a latency of communication between the storage server 100 and the client device 200, determining an execution time for executing the I/O instruction by a storage of the storage server 100 (e.g., the storage 140, FIG. 1) and determining whether the combined latency and execution time are less than or equal to a required time.

In another embodiment, a minimal latency between the client device and another storage server as well as a minimal execution time of a storage of the other storage server are determined. In such an embodiment, whether the I/O instruction can be executed may be determined by comparing the required time to the combined latency of the storage server 100, execution time of the storage server 100, minimal latency of the other storage server, and minimal execution time of the other storage server. The I/O instruction can be executed when the combination is less than or equal to the required time.

At S530, when it is determined that the I/O instruction can be executed, the I/O instruction is executed.

At S540, when it is determined that the I/O instruction cannot be executed, a notification is generated and sent to the client device 200.

In an embodiment, S540 may further include aborting the I/O instruction. In another embodiment, S540 may further include sending the I/O instruction to be executed, the SLA indicators, or both, to another storage server for execution. The other storage server may be configured to perform the method of FIG. 5 to ensure that the other server can meet the SLA requirements before executing the I/O instruction.

At S550, it is determined whether additional I/O instructions have been received and, if so, execution continues with S520; otherwise, execution terminates.

Figure 6:
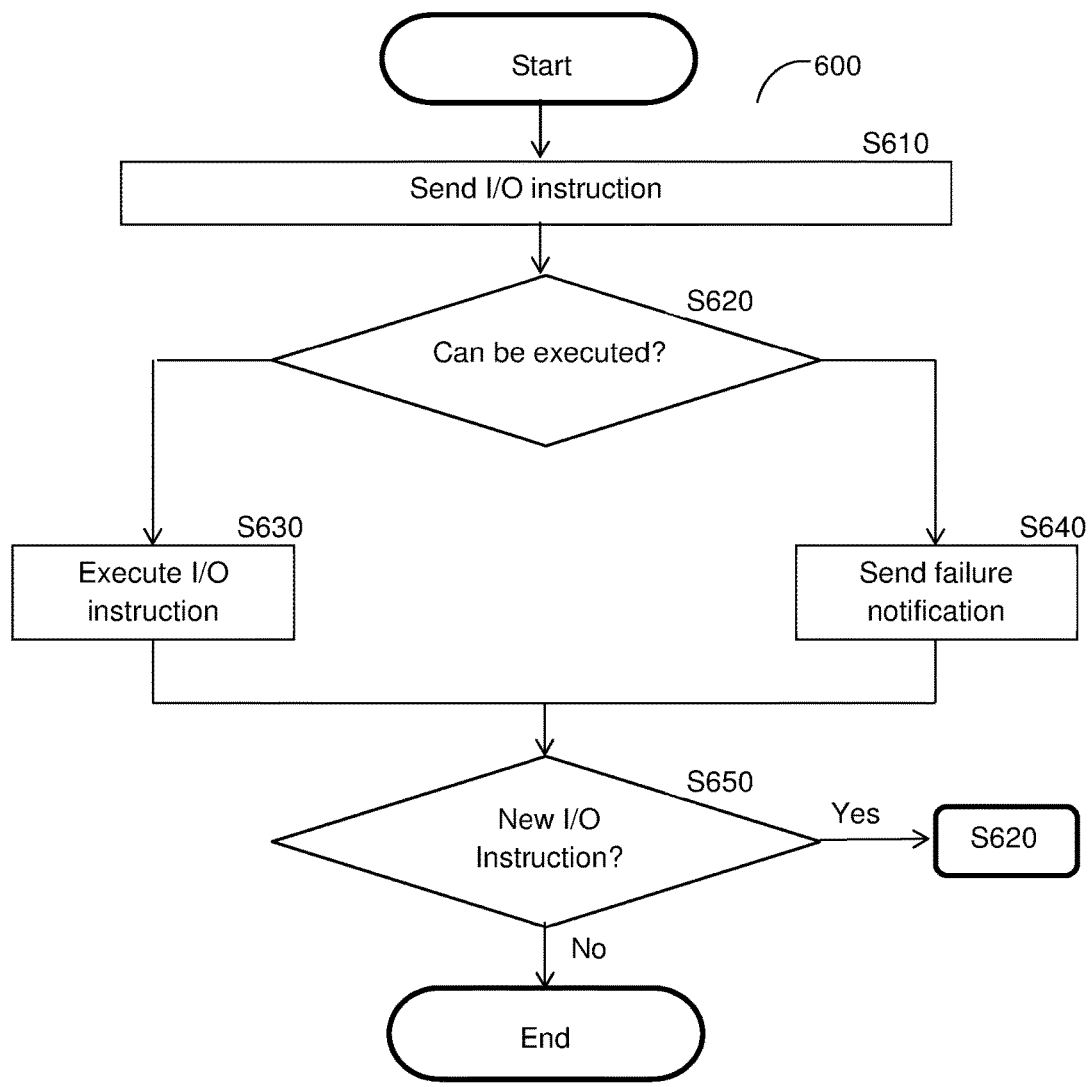
FIG. 6 is a flowchart illustrating a method for providing I/O determinism according to an embodiment.

FIG. 6 is an example flowchart 600 illustrating a method for providing I/O determinism by a storage server including one or more storages according to an embodiment. In an embodiment, the method may be performed by the storage server 300 to provide efficient and secure memory access to a storage 340-1 of the storage server 300.

At S610, an I/O instruction is sent to the storage 340-1. The I/O instruction may be sent by a processing circuitry (e.g., the processing circuitry 310) of the storage server 300. In an embodiment, service level agreement (SLA) indicators are also sent. The SLA indicators may indicate one or more requirements for executing the I/O instruction. The I/O instruction may be, for example, read write, erase, trim, a combination thereof, and the like.

At S620, it is determined, by the storage 340-1, whether the sent I/O instruction can be executed and, if so, execution continues with S630; otherwise, execution continues with S640. In an embodiment, the I/O instruction can be executed if the execution of the I/O instruction will meet the requirements for executing the I/O instruction. The determination is based on one or more requirements such as, but not limited to, requirements indicated in the received SLA indicators, requirements indicated in a SLA for the storage 340-1, and the like. The SLA agreement may define requirements with respect to, for example, different types of I/O instructions (e.g., read, write, erase, trim, etc.), different I/O queues, and the like.

Determining whether the I/O instruction can be executed may include, but is not limited to, determining a time to execute the I/O instruction. The time to execute the I/O instruction may be determined based on, but not limited to, a current condition of the storage 340-1.

At S630, when it is determined that the I/O instruction can be executed, the I/O instruction is executed by the storage 340-1.

At S640, when it is determined that the I/O instruction cannot be executed, a notification is generated and sent by the storage 340-1.

In an embodiment, S640 may further include aborting the I/O instruction. In another embodiment, S640 may further include sending the I/O instruction to be executed to another storage 340-2 for execution. In yet another embodiment, S640 may further include sending the I/O instruction to be executed to another storage server (e.g., the storage server 100-1, FIG. 3). To this end, S640 may also include determining where to send the I/O instruction, for example, based on the requirements for executing the I/O instruction.

In an embodiment, S640 may include determining a first latency of communication between the server 300 and the second server 100-1 as well as a first execution time for executing the I/O instruction by a storage 140 of the second server 100-1. In such an embodiment, the I/O instruction can be executed when the first execution time and the first latency combined are less than or equal to a required time. In a further embodiment, S640 may further include determining a minimal latency between the storage server 300 and the other server 100-1 and a minimal execution time for executing the I/O instruction by the other server 100-1, where the I/O instruction can be executed if the determined first latency, first execution time, minimal latency and execution time combined are less than or equal to a required time.

At S650, it is determined whether additional I/O instructions have been received and, if so, execution continues with S620; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for providing input/output (I/O) determinism for a server hosting at least a remotely accessible storage, comprising:
   receiving an I/O instruction and at least one service level indicator from a client device, wherein the at least one service level indicator includes a required time for executing the I/O instruction;
   determining whether the I/O instruction can be executed on the storage within the required time, wherein determining whether the I/O instruction can be executed on the storage within the required time further comprises:
      determining a first latency of communication between the server and the client device; and
      determining a first execution time for executing the I/O instruction on the storage, wherein it is determined that the I/O instruction can be executed on the storage within the required time when a sum of the first latency and the first execution time is less than the required time; and
   sending, to the client device, a notification, when it is not determined that the I/O instruction can be executed on the storage within the required time.

2. The method of claim 1, further comprising:
   executing the I/O instruction on the storage, when it is determined that the I/O instruction can be executed on the storage within the required time.

3. The method of claim 1, further comprising:
   determining a second latency, wherein the second latency is a minimal latency between the client device and another server;
   determining a second execution time, wherein the second execution time is a minimal execution time by a storage of the other server, wherein it is determined that the I/O instruction can be executed on the storage of the other server within the required time when a sum of the first latency, the first execution time, the second latency, and the second execution time is less than the required time; and
   sending, to the storage of the other server, the I/O instruction for execution, when it is determined the I/O instruction can be executed on the storage of the other server within the required time.

4. A non-transitory computer readable medium having stored thereon instructions for causing a processing circuitry to execute the method according to claim 1.

5. A system for providing input/output (I/O) determinism, comprising:
   a storage;
   a processing circuitry; and
   a memory, the memory containing instructions that, when executed by the processing circuitry, configure the system to:
   receive an I/O instruction and at least one service level indicator from a client device, wherein the at least one service level indicator includes a required time for executing the I/O instruction;
   determine a first latency of communication between the system and the client device;
   determine a first execution time for executing the I/O instruction on the storage;
   determine whether the I/O instruction can be executed on the storage within the required time, wherein it is determined that the I/O instruction can be executed on the storage within the required time when a sum of the first latency and the first execution time is less than the required time; and
   send, to the client device, a notification, when it is not determined that the I/O instruction can be executed on the storage within the required time.

6. The system of claim 5, wherein the system is further configured to:
   execute the I/O instruction on the storage, when it is determined that the I/O instruction can be executed on the storage within the required time.

7. The system of claim 5, wherein the system is further configured to:
   determine a second latency, wherein the second latency is a minimal latency between the client device and another server;
   determine a second execution time, wherein the second execution time is a minimal execution time by a storage of the other server, wherein it is determined that the I/O instruction can be executed on the storage of the other server within the required time when a sum of the first latency, the first execution time, the second latency, and the second execution time is less than the required time; and
   send, to the storage of the other server, the I/O instruction for execution, when it is determined the I/O instruction can be executed on the storage of the other server within the required time.

8. A method for providing input/output (I/O) determinism for a server hosting at least a storage, the server including a processing circuitry, comprising:
   sending, by the processing circuitry to the storage, an I/O instruction and at least one service level indicator, wherein the at least one service level indicator includes a required time for executing the I/O instruction;
   determining, by the storage, whether the I/O instruction can be executed on the storage within the required time; and
   sending, to the processing circuitry by the storage, a notification, when it is not determined that the I/O instruction can be executed on the storage within the required time;
   sending the I/O instruction to another server including at least one other storage, wherein the I/O instruction is sent to the other server when the I/O instruction can be executed on the at least one other storage within the required time;
   determining a latency of communication between the server and the other server;
   determining an execution time for executing the I/O instruction on the at least one other storage, wherein the I/O instruction can be executed on the at least one other storage within the required time when a sum of the determined latency and the determined execution time is less than the required time; and
   sending, to the at least one other storage, the I/O instruction for execution, when it is determined that the I/O instruction can be executed on the at least one other storage within the required time.

9. The method of claim 8, further comprising:
executing the I/O instruction on the storage, when it is determined that the I/O instruction can be executed on the storage within the required time.

10. The method of claim 8, further comprising:
determining a first execution time for executing the I/O instruction on the storage;
determining a second execution time for executing the I/O instruction on another storage hosted by the server; and
executing the I/O instruction on the storage having the lowest execution time among the first execution time and the second execution time.

11. A non-transitory computer readable medium having stored thereon instructions for causing a processing circuitry to execute the method according to claim 8.

12. A system for providing input/output (I/O) determinism, comprising:
a storage;
a processing circuitry; and
a memory, the memory containing instructions that, when executed by the processing circuitry, configure the system to:
sending, by the processing circuitry to the storage, an I/O instruction and at least one service level indicator, wherein the at least one service level indicator includes a required time for executing the I/O instruction;
determining, by the storage, whether the I/O instruction can be executed on the storage within the required time; and
sending, to the processing circuitry by the storage, a notification, when it is not determined that the I/O instruction can be executed on the storage within the required time;
send the I/O instruction to another server including at least one other storage;
determine a latency of communication between the server and the other server;
determine an execution time for executing the I/O instruction on the at least one other storage, wherein the I/O instruction can be executed on the at least one other storage within the required time when a sum of the determined latency and the determined execution time is less than the required time; and
send, to the at least one other storage, the I/O instruction for execution, when it is determined that the I/O instruction can be executed on the at least one other storage within the required time.

13. The system of claim 12, wherein the system is further configured to:
execute the I/O instruction on the storage, when it is determined that the I/O instruction can be executed on the storage within the required time.

14. The system of claim 12, wherein the system is further configured to:
determine a first execution time for executing the I/O instruction on the storage;
determine a second execution time for executing the I/O instruction on another storage hosted by the server; and
execute the I/O instruction on the storage having the lowest execution time among the first execution time and the second execution time.

* * * * *